J. T. LEONARD.
MOTOR PROTECTING CIRCUIT BREAKER.
APPLICATION FILED MAR. 20, 1913.
1,134,752.  Patented Apr. 6, 1915.
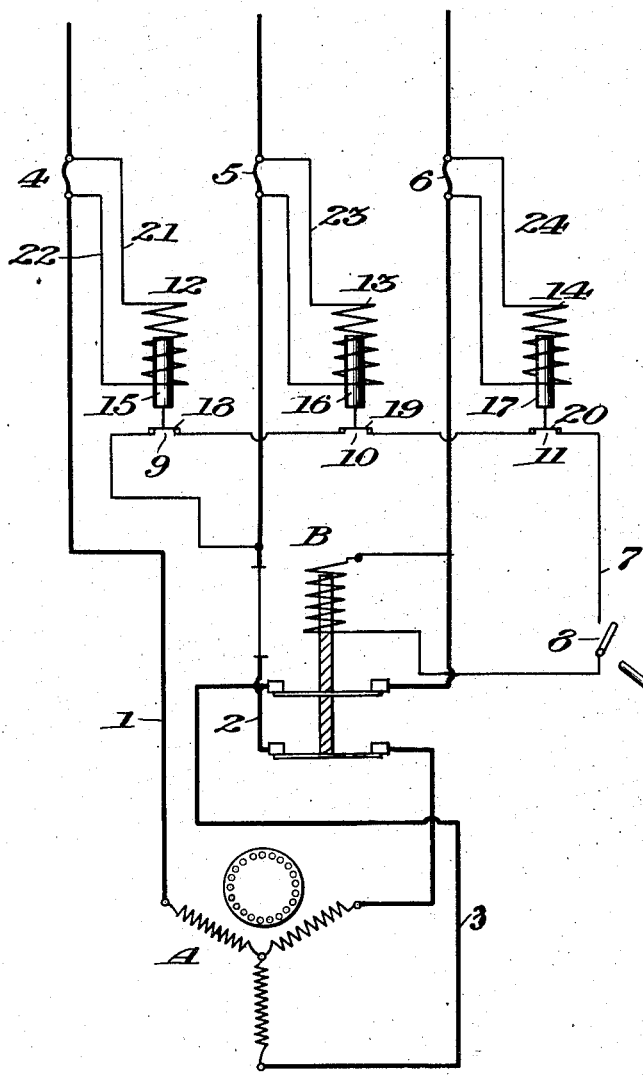
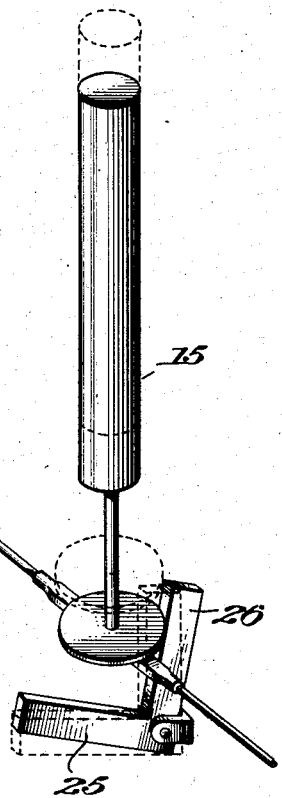

UNITED STATES PATENT OFFICE.

JOHN T. LEONARD, OF WICHITA, KANSAS.

MOTOR-PROTECTING CIRCUIT-BREAKER.

1,134,752. Specification of Letters Patent. Patented Apr. 6, 1915.

Application filed March 20, 1913. Serial No. 755,689.

*To all whom it may concern:*

Be it known that I, JOHN T. LEONARD, a citizen of the United States, residing at Wichita, in county of Sedgwick and State of Kansas, have invented certain new and useful Improvements in Motor-Protecting Circuit-Breakers, of which the following is a specification.

My invention relates to an improvement in motor protecting circuit breakers and is more particularly adaptable for use with a multiphase motor. In the operation of motors of multiphase circuits there is always the danger of one or more of the phases becoming short circuited creating an abnormal circuit which tends to destroy the motor. When the motor is used in sewerage, water and other stations and is automatically stopped or started by a mechanically controlled switch the short-circuiting is particularly apt to occur or one or more of the fuses is apt to be blown or melted out, due to variations in the current.

One of the objects of my invention therefore is to provide means whereby when the fuse in one of the line wires is blown or melted out, the circuit of the phase or phases will be automatically opened. This I accomplish by having a shunt circuit arranged over each fuse and operating a solenoid switch in the circuit which controls the magnetic switch of the main line; thus if the fuse in any one of the line wires is blown the circuit which closes the electro-magnetic switch is broken and this switch opens to open the main circuit, thus protecting the motor against abnormal circuit conditions in a reliable, simple and efficient manner.

This invention consists of certain novel features of construction and combinations of parts which will be hereinafter more fully described and pointed out in the claims.

In the accompanying drawings I have shown my invention embodied in concrete form for purposes of illustration.

Figure 1 is a diagrammatic view to show the manner of wiring; and Fig. 2 is a detail perspective view to better illustrate one of the solenoid switches.

In the drawings I have shown my invention as applied to a tri-phase induction motor A, the main line wires 1, 2 and 3 being connected therewith for supplying the several phases. These wires have the fuses 4, 5 and 6 connected in their length. An electro-magnetic switch B is connected in the line wires 2 and 3 for controlling the circuit, and this switch is controlled by a circuit 7 in which a knife or other manually operated switch 8 is provided to control the circuit to the electro-magnetic switch B.

Gaps 9, 10 and 11 are formed in the line wire of the switch circuit 7. Solenoids 12, 13 and 14 are located adjacent these gaps and the armatures 15, 16 and 17 respectively have the bars or disks 18, 19 and 20 carried in a position to rest upon and bridge the contacts of the gaps 9, 10 and 11 respectively in the switch circuit 7 when the solenoids are deënergized. The solenoid 12 is connected by wires 21 and 22 with the main line wire 1. The wire 21 being connected on the one side of the fuse 4 and the wire 22 on the opposite side. Similar shunt circuits 23 and 24 connect the solenoids 13 and 14 and the wires 2 and 3 respectively to bridge or cut around the fuses 5 and 6 of these wires.

The shunt circuits to the solenoids are preferably of relatively high resistance and the fuses of materially less resistance; consequently the main portion of the circuit passes through the fuses 4, 5 and 6 and the solenoids 12, 13 and 14 do not under normal conditions receive an amount of current to sufficiently energize them to draw the armatures into the coil and open the gaps 9, 10 and 11.

To start the motor the switch 8 is closed, which completes the switch circuit 7, causing the electro-magnetic switch B to be thrown to close the main line circuit. As the fuses 4, 5 and 6 are intact and the gaps 9, 10 and 11 are bridged, the motor will start and the electro-magnetic switch will be held closed. When one of the fuses 4, 5 or 6 burns out the current in that branch of the main line is shunted through the solenoid, drawing the armature into the coil and opening the gap in the switch circuit 7. This causes the electro-magnetic switch B to be automatically opened and breaks the main line circuit.

A bell crank 25 is pivoted in juxtaposition to each of the bars or disks 18, 19 and 20 so that one of its arms 26 rests against the disk and when the armature has been raised to a sufficient height, this arm 26 will move beneath the disk and prevent its return to the closing position which would be the normal tendency as the solenoid is deënergized, due to the opening of the electro-magnetic switch and consequent breaking of the main circuit.

Having fully described my invention, what I claim as new and desire to secure by Letters Patent is—

1. In combination with a multi-phase circuit having a fuse in each of the wires thereof, an electro-magnetic switch of the underload break type positioned to open and close said circuit wires, a switch circuit connected with said electro-magnetic switch, and with the main circuit, and means connected between the switch circuit and supply circuit whereby when one of the fuses burns out, the switch circuit will be broken and the switch permitted to open, consequently opening the main circuit.

2. The combination with a multi-phase circuit having a fuse in each of the wires thereof, an electro-magnetic switch of the under load break type, positioned to open and close said circuit wires, a switch circuit connected with said electro-magnetic switch and with the main circuit, and mechanical means operated by a circuit connected with the main circuit to come into action when one of the fuses burns out, and break the switch circuit, thereby permitting the switch to open and consequently opening the main circuit.

3. The combination with a multi-phase circuit having in each of the wires thereof an electro-magnetic switch of the under load break type positioned to open and close said circuit wires, a switch circuit connected with said electro-magnetic switch and with the main circuit, said switch circuit provided with a plurality of gaps and shunt circuits, around each of said fuses, mechanical means to normally close the gaps of said switch circuit, thereby holding the electro-magnetic switch normally in closed position, and means connected in the shunt circuit to be energized when one of the fuses burns out for opening one of the gaps in the switch circuit, thus permitting the switch to open and consequently opening the main circuit.

4. The combination with a multi-phase circuit having a fuse in each of the wires thereof, an electro-magnetic switch of the under load break type positioned to open and close said circuit, wires, a switch circuit connected with said electro-magnetic switch and with the main circuit, said switch circuit having a plurality of gaps, mechanical means to normally close said gaps whereby the connection through the switch circuit is completed, and the switch is held normally closed, a shunt circuit arranged around the fuse of each wire, a solenoid connected in each shunt circuit positioned to be removed, said mechanical means closing the gaps of the switch circuit when one of the fuses burns out, thus breaking the switch circuit and consequently opening the switch, and mechanical means to hold said gap-closing mechanism in its open position.

5. A controlling means for poly-phase motors comprising a fuse connected in each of the motor leads, a coil connected in shunt with each of said fuses, a switch controlled by each coil, a switch controlling the circuit through all of the motor leads, a normally energized coil connected to the supply circuit for the motor, and means for releasing and opening said last-named switch on de-energization of said normally energized coil, the connection for said coil including the aforesaid switches controlled by coils in shunt with the respective fuses.

6. A controlling means for poly-phase motors, comprising a no-voltage coil in circuit with the motor leads, means controlled by the no-voltage coil for opening the motor circuit upon a drop of voltage, a fuse included in each motor lead, a high resistance coil in shunt with each fuse, and means controlled by each of said latter coils to open the circuit through the no-voltage coil on effective energization of a second coil due to rupture of the corresponding fuse.

In testimony whereof I affix my signature, in the presence of two witnesses.

JOHN T. LEONARD.

Witnesses:
 NORMAN H. BEEBE,
 GEORGE B. COLE.